US008508804B2

(12) United States Patent
Watanabe

(10) Patent No.: US 8,508,804 B2

(45) Date of Patent: Aug. 13, 2013

(54) MOVEMENT DETECTION APPARATUS AND RECORDING APPARATUS

(75) Inventor: Taichi Watanabe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 359 days.

(21) Appl. No.: 12/911,567

(22) Filed: Oct. 25, 2010

(65) Prior Publication Data

US 2011/0102850 A1 May 5, 2011

(30) Foreign Application Priority Data

Oct. 30, 2009 (JP) ................................. 2009-250826

(51) Int. Cl.
*H04N 1/407* (2006.01)

(52) U.S. Cl.
USPC ......... 358/3.26; 358/3.27; 358/139; 399/208; 399/236; 399/396; 399/162; 399/239; 399/278; 399/288; 399/303; 399/312; 399/313; 399/66; 399/101; 399/121; 399/308; 399/388

(58) Field of Classification Search
None
See application file for complete search history.

(56) References Cited

U.S. PATENT DOCUMENTS

| | | | | |
|---|---|---|---|---|
| 5,995,717 | A * | 11/1999 | Tanaka | 358/1.9 |
| 6,323,955 | B1 * | 11/2001 | Kanai et al. | 358/1.17 |
| 7,697,836 | B2 * | 4/2010 | Pozniansky et al. | 396/159 |
| 7,796,928 | B2 * | 9/2010 | Kinoshita et al. | 399/301 |
| 8,056,808 | B2 * | 11/2011 | Epshteyn | 235/462.17 |
| 8,064,782 | B2 * | 11/2011 | Nakazato et al. | 399/9 |
| 8,280,194 | B2 * | 10/2012 | Wong et al. | 382/299 |
| 8,331,813 | B2 * | 12/2012 | Ozeki | 399/49 |
| 2004/0169896 | A1 * | 9/2004 | Kondo | 358/482 |
| 2004/0263920 | A1 * | 12/2004 | Kondo et al. | 358/497 |
| 2009/0102935 | A1 * | 4/2009 | Hung et al. | 348/222.1 |
| 2011/0102815 | A1 * | 5/2011 | Watanabe | 358/1.5 |

FOREIGN PATENT DOCUMENTS

JP 2007-217176 A 8/2007

* cited by examiner

*Primary Examiner* — Dung Tran

(74) *Attorney, Agent, or Firm* — Canon U.S.A., Inc. IP Division

(57) ABSTRACT

When at least one of first image data and second image data is captured, according to a moving speed of an object while an image sensor is capturing an image, exposure time for capturing the image is controlled to decrease a difference between object blur widths in a direction in which the object moves.

16 Claims, 15 Drawing Sheets

MOVEMENT DETECTION APPARATUS AND RECORDING APPARATUS

BACKGROUND OF THE INVENTION

1. Field of the Invention

The present invention relates to a technique for detecting a movement of an object by using image processing.

2. Description of the Related Art

When printing is performed while a medium such as a print sheet is being conveyed, if conveyance accuracy is low, density unevenness of a halftone image or a magnification error may be generated, thereby deteriorating quality of acquired print images. Therefore, although high-performance components are adopted and an accurate conveyance mechanism is mounted, requests about print qualities are demanding, and further enhancement of accuracy is requested. In addition, requests about costs are also demanding. Both of high accuracy and low costs are requested.

To address these issues, and thus, to detect a movement of a medium with high accuracy and perform stable conveyance by a feedback control, it has been attempted to capture the image of a surface of the medium and detect the movement of the medium that is being conveyed by image processing.

Japanese Patent Application Laid-Open No. 2007-217176 discusses a method for detecting the movement of the medium. According to Japanese Patent Application Laid-Open No. 2007-217176, an image sensor captures images of a surface of a moving medium several times in chronological order, the acquired images are compared with each other by performing pattern matching processing, and thus an amount of the movement of the medium can be detected. Hereinafter, a method in which a movement state is detected by directly detecting the surface of the object is referred to as "direct sensing", and a detector using this method is referred to as a "direct sensor".

When the direct sensing is used to detect the movement, the surface of the medium is to be optically and sufficiently identified and unique patterns are to be obvious. However an applicant of the present exemplary embodiment has found that, under conditions described below, accuracy of pattern matching can be deteriorated.

When the object moves while being captured, the image sensor captures the images having objet blur. If the image sensor captures two images moving at the same speed at different times, both images have the similar object blur. However, since amounts of the object blurs have no relative difference therebetwen, unless the amounts of the object blurs are large enough to delete unique image patterns, no serious incidents with accuracy of the pattern matching arise.

The situation can arise when the object moves at largely different speeds, when the images are captured, to cause the object blurs having largely different object blur widths therebetween. For example, in FIG. 15, a first image 912 has an object blur width 921, a second image 913 has an object blur width 922. A relative difference 920 indicates an amount of difference between the object blur widths. The larger the relative difference 920 is, the more deterioration the accuracy of the pattern matching has.

SUMMARY OF THE INVENTION

According to an aspect of the present invention, an apparatus including a sensor configured to capture an image of a surface of a moving object to acquire first data and second data, a processing unit configured to acquire a movement state of the object by clipping a template pattern from the first data and seeking a region having a high correlation with the template pattern in the second data, and a control unit configure to control the sensor to decrease a difference between an object blur widths in a direction in which the object moves in the first data and the object blur width in the second data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Hereinafter, an exemplary embodiment of the present invention will be described. Configuration components described in the exemplary embodiment are merely one of the examples and not intended to limit a scope of the present invention thereto.

In this specification, after an image sensor receives an instruction for capturing a image of an object, a period (time) from when each light-receiving element included in the image sensor starts photoelectric conversion and storing charges until when each light-receiving element ends thereof is defined as an "exposure time". When the object moves during the exposure time, the images while the object is moving are superposed, and thus object blur is generated.

In an actual circuit, there is a slight delay from when the image sensor receives a signal for starting exposure until when the image sensor actually starts the exposure. Further, timings of starting and stopping the exposure may be slightly different depending on each light-receiving element forming the image sensor.

This specification is described assuming that starting and stopping the exposure is ideally performed on all pixels simultaneously without any delay. However, this assumption is for making descriptions easier to be understood by focusing on an error factor to be improved by the present invention among a plenty of error factors, not to limit an application scope of the present invention to the ideal apparatus described above.

Figure 15:
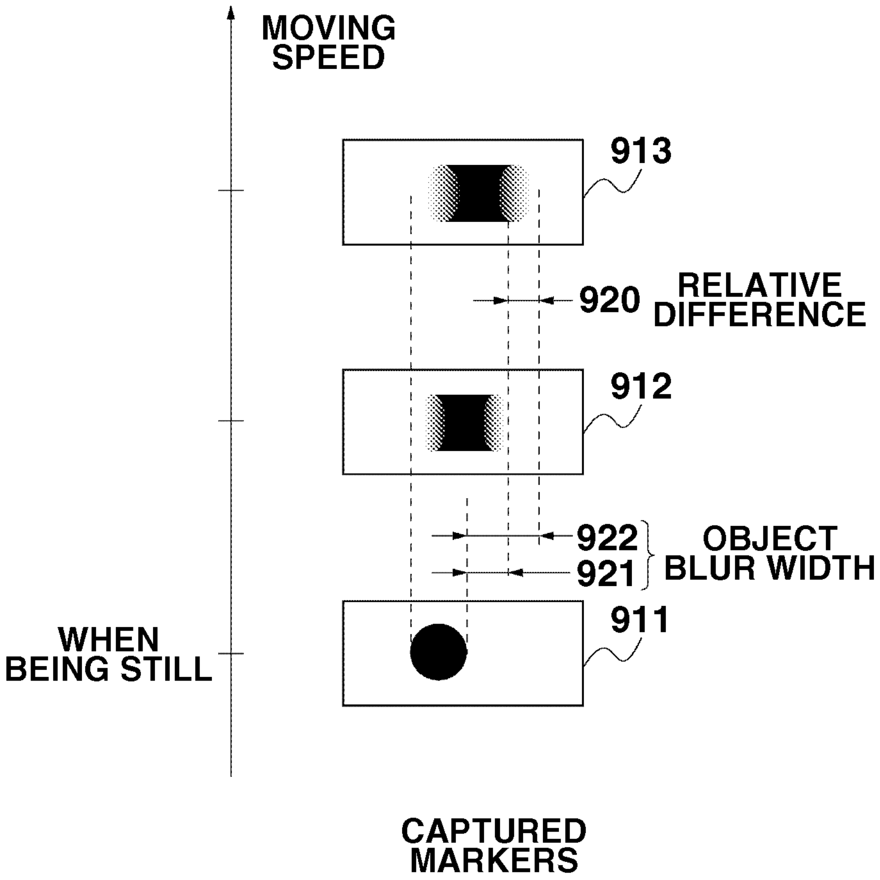
FIG. 15 illustrates an object blur.

In this specification, a width (widths 921 and 922 illustrated in FIG. 15) in which the object moves from when the exposure is started until when the exposure is stopped in one image capture is defined as an "object blur width". In the above-described ideal exposure, the width corresponds to a multiplication of an average speed of the object during the exposure and an exposure time. According to the present exemplary embodiment, the object (moving body) is a medium to be recorded (e.g., paper) and a conveyance belt conveying the medium.

The application range of the present invention includes printers and other technical fields to which the detection of the movement of an object with high accuracy is requested. For example, the present invention can be applied to devices such as printers and scanners, and also devices used in a manufacturing field, an industrial field, and a distribution field where various types of processing such as examination, reading, processing, and marking are performed while the object is being conveyed.

Further, the present invention can be applied to various types of printers employing an ink-jet method, an electrophotographic method, a thermal method, and a dot impact method.

In this specification, a "medium" refers to a medium having a sheet shape or a plate shape made of paper, plastic sheet, film, glass, ceramic, or resin. In addition, an upstream and a downstream described in this specification are determined based on a conveyance direction of a sheet while image recording is being performed on the sheet.

An exemplary embodiment of the printer of the ink-jet method, which is an example of the recording apparatuses, will be described. The printer of the present exemplary embodiment is a serial printer, in which a reciprocate movement (main scanning) of a printer head and step feeding of a medium by a predetermined amount are alternately performed to form a two-dimensional image.

The present invention can be applied not only to the serial printer but also to a line printer including a long line print head for covering a print width, in which the medium moves with respect to the fixed print head to form the two-dimensional image.

Figure 1:
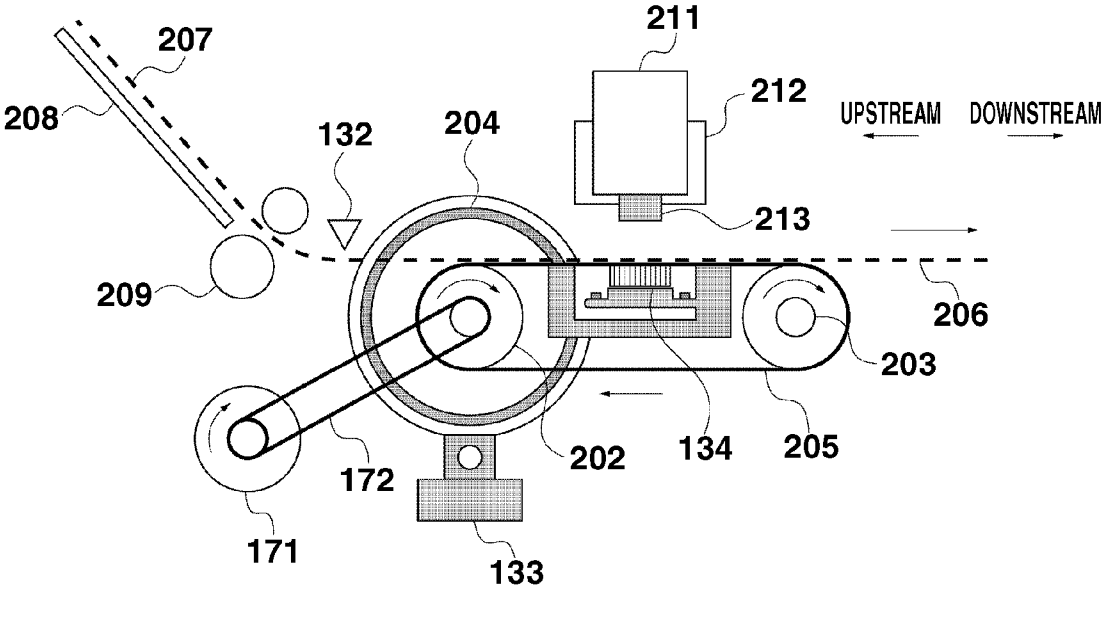
FIG. 1 is a vertical cross sectional view of a printer according to an exemplary embodiment of the present invention.

FIG. 1 is a vertical cross sectional view illustrating a configuration of a main part of the printer. The printer includes a conveyance mechanism that causes a belt conveyance system to moves the medium in a sub scanning direction (first direction or predetermined direction) and a recording unit that performs recording on the moving medium using the print head. The printer further includes an encoder 133 that indirectly detects a movement state of the object and a direct sensor 134 that directly detects the movement state thereof.

The conveyance mechanism includes a first roller 202 and a second roller 203, which are rotating members, and a wide conveyance belt 205 stretched around the rollers described above with a predetermined tension. A medium 206 is attracted to a surface of the conveyance belt 205 with an electrostatic force or adhered thereto, and conveyed along with the movement of the conveyance belt 205.

A rotating force generated by a conveyance motor 171, which is a driving force of sub scanning, is transmitted to the first roller 202, which is a driving roller, via a driving belt 172 to rotate the first roller 202. The first roller 202 and the second roller 203 rotate in synchronization with each other via the conveyance belt 205.

The conveyance mechanism further includes a feeding roller 209 for separating each one of the media 207 stored on a tray 208 and feeding the medium 207 onto a conveyance belt 205, and a feeding motor 161 (not illustrated in FIG. 1) for driving the feeding roller 209.

A paper end sensor 132 provided at a downstream of the feeding motor 161 detects a front end or a rear end of the medium to acquire timing for conveying the medium.

The encoder 133 (rotation angle sensor) of a rotary type detects a rotation state of the first roller 202 and indirectly acquires a movement state of the conveyance belt 205. The encoder 133 includes a photo-interrupter and optically reads slits carved at equal intervals along a periphery of a code wheel 204 provided about a same axis as that of the first roller 202, to generate pulse signals.

A direct sensor 134 is disposed beneath the conveyance belt 205 (at a rear side opposite to a side on which the medium 206 is placed). The direct sensor 134 includes an image sensor (imaging device) that captures an image of a region including a marker marked on the surface of the conveyance belt 205. The direct sensor 134 directly detects the movement state of the conveyance belt 205 by image processing described below.

Since the surface of the conveyance belt 205 and that of the medium 206 are firmly adhered to each other, a relative position change caused by slipping between the surfaces of the belt and the medium is small enough to be ignored. Therefore, the direct sensor 134 can be considered to perform the detection equivalent to the direct detection of the movement state of the medium 206.

The direct sensor 134 is not limited to capturing the image of the rear surface of the conveyance belt 205, but may capture the image of a front surface of the conveyance belt 205 that is not covered with the medium 206. Further, the direct sensor 134 may capture the image of the surface of the medium 206 not that of the conveyance belt 205, as the object.

A recording unit includes a carriage 212 that reciprocatingly moves in a main scanning direction, and a print head 213 and an ink tank 211 that are mounted on the carriage 212. The carriage 212 reciprocatingly moves in the main scanning direction (second direction) by a driving force of a main scanning motor 151 (not illustrated in FIG. 1). Ink is discharged from nozzles of the print head 213 in synchronization with the movement described above to perform printing on the medium 206.

The print head 213 and the ink tank 211 may be unified to be attachable to and detachable from the carriage 212, or may be individually attachable to and detachable from the carriage 212 as separate components. The print head 213 discharges the ink by the ink-jet method. The method can adopt heater elements, piezo-electric elements, static elements, and micro electro mechanical system (MEMS) devices.

Figure 2:
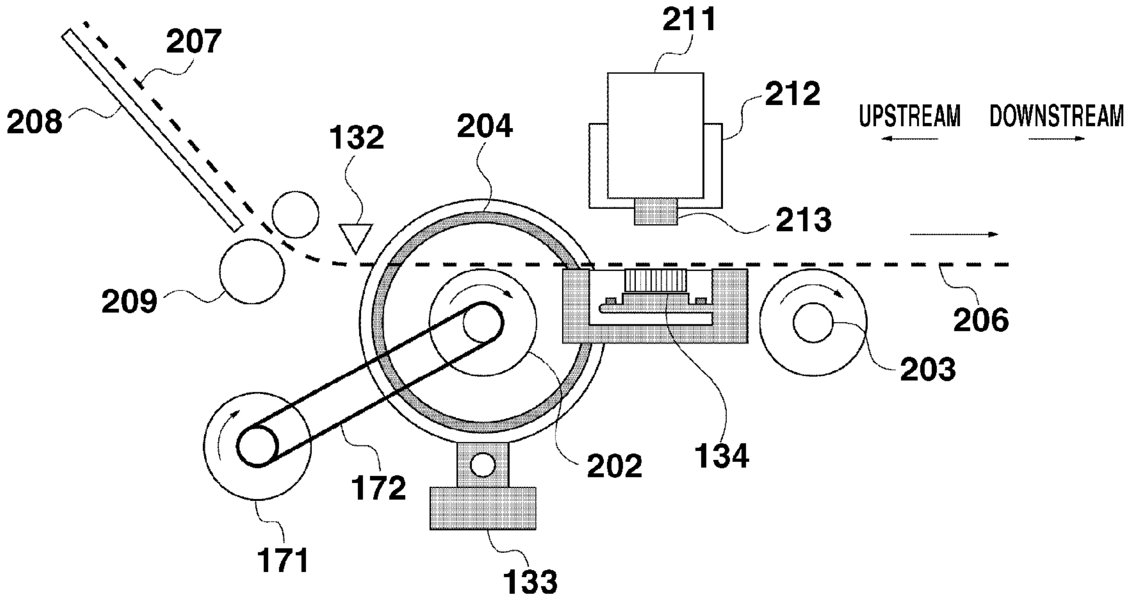
FIG. 2 is a vertical cross sectional view of a modified printer.

The conveyance mechanism is not limited to the belt conveyance system, but, as a modification example, may adopt a mechanism for causing the conveyance roller to convey the medium without using the conveyance belt. FIG. 2 illustrates a vertical cross sectional view of a printer of a modification example. Same numerals are given to same members as those in FIG. 1.

Each of the first roller 202 and the second roller 203 directly contacts the medium 206 to move the medium 206. A synchronization belt (not illustrated) is stretched around the first roller 202 and the second roller 203, so that the second roller 203 rotates in synchronization with a rotation of the first roller 202.

According to this exemplary embodiment, the object whose image is captured by the direct sensor 134 is not the conveyance belt 205 but the medium 206. The direct sensor 134 captures the image of the rear surface side of the medium 206.

Figure 3:
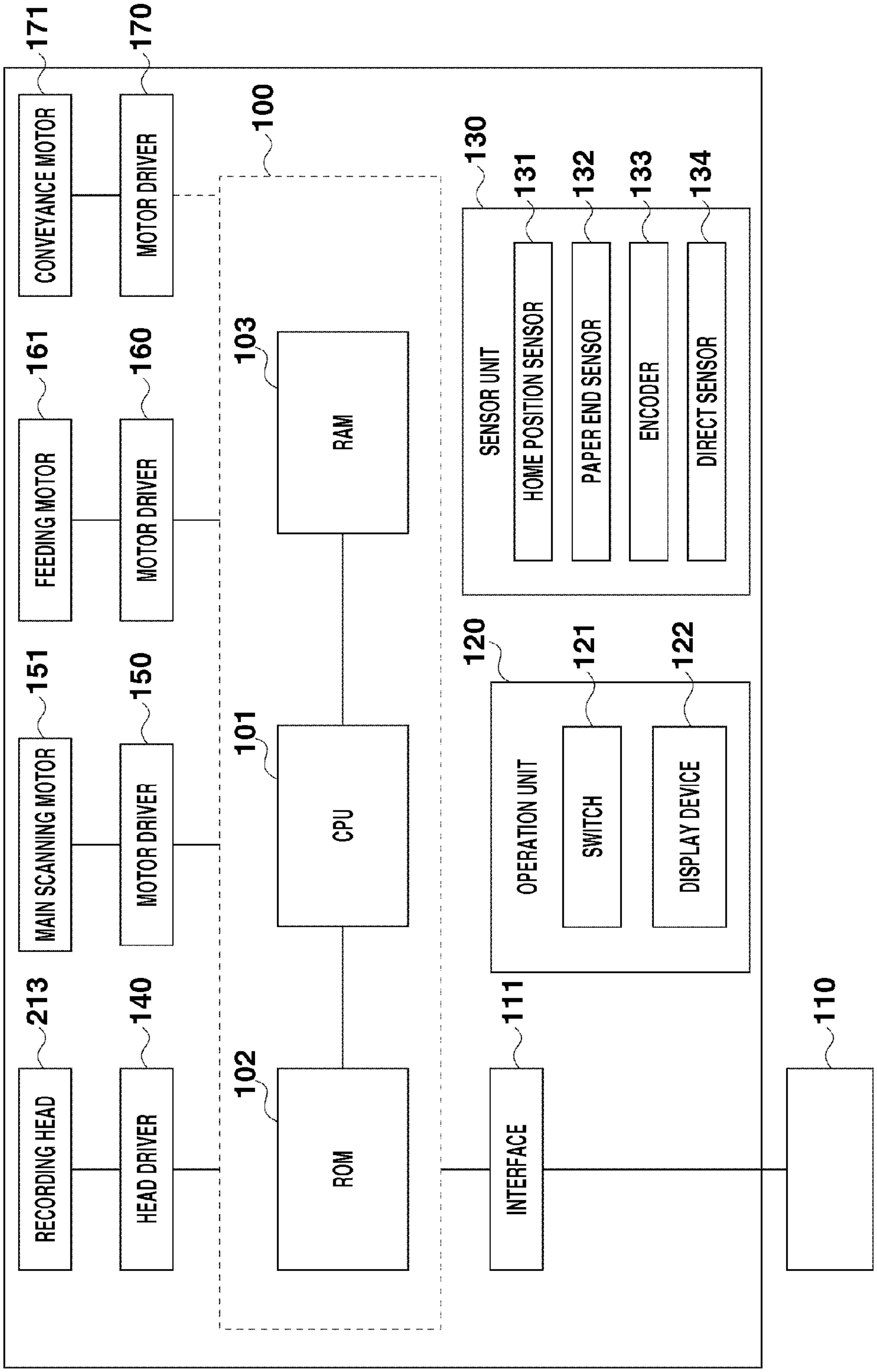
FIG. 3 is a system block diagram of the printer.

FIG. 3 is a block diagram of a system of the printer. The controller 100 includes a central processing unit (CPU) 101, a read only memory (ROM) 102, and a random access memory (RAM) 103. The controller 100 includes both of a control unit and a processing unit that perform various types of controls and image processing in an entire printer.

An information processing apparatus 110 is an apparatus that supplies image data to be recorded on the medium such as a computer, a digital camera, a television set (TV), and a mobile phone. The information processing apparatus 110 is connected to the controller 100 via an interface 111. An operation unit 120 serves as a user interface between the apparatus and an operator, and includes various types of input switches 121 including a power source switch, and a display device 122.

A sensor unit 130 is a group of sensors that detect various kinds of states of the printer. A home position sensor 131 detects a home position of the carriage 212 that reciprocatingly moves. The sensor unit 130 includes the paper end sensor 132, the encoder 133, and the direct sensor 134 described above. Each of these sensors is connected to the controller 100.

Based on instructions of the controller 100, the printer head and various types of motors of the printer are driven via drivers. A head driver 140 drives the print head 213 according to recording data. A motor driver 150 drives a main scanning motor 151. A motor driver 160 drives a feeding motor 161. A motor driver 170 drives a conveyance motor 171 for sub scanning.

Figure 4:
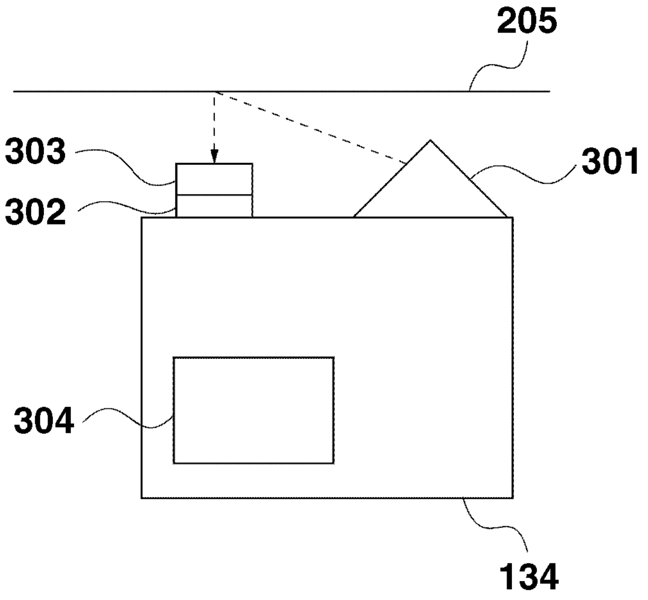
FIG. 4 illustrates a configuration of a direct sensor.

FIG. 4 illustrates a configuration of the direct sensor 134 for performing direct sensing. The direct sensor 134 is a sensor unit including a light emitting unit including alight source 301 of light emitting diode (LED), organic light emitting diode (OLED), and semi conductor laser, a light-receiving unit including an image sensor 302 and a refractive index distribution lens array 303, and a circuit unit 304 including a drive circuit and an analog/digital (A/D) convertor circuit. The light source 301 irradiates a part of the rear surface side of the conveyance belt 205, which is an imaging target.

The image sensor 302 captures an image of a predetermined imaging region irradiated via the refractive index distribution lens array 303. The image sensor 302 is a two-dimensional area sensor or a line sensor such as a charge coupled device (CCD) image sensor or a complementary metal-oxide semiconductor (CMOS) image sensor. Signals of the image sensor 302 are A/D converted and taken in as digital image data.

The image sensor 302 captures the image of the surface of the object (conveyance belt 205) and acquires a plurality of image data (pieces of sequentially acquired data are referred to as “first image data” and “second image data”) at different timings. As described below, the movement state of the object can be acquired by clipping the template pattern from the first image data and seeking a region that has a high correlation with the acquired template pattern in the second image data by the image processing.

The controller 100 may serve as the processing unit for performing the image processing, or the processing unit may be included in a unit of the direct sensor 134.

Figure 5:
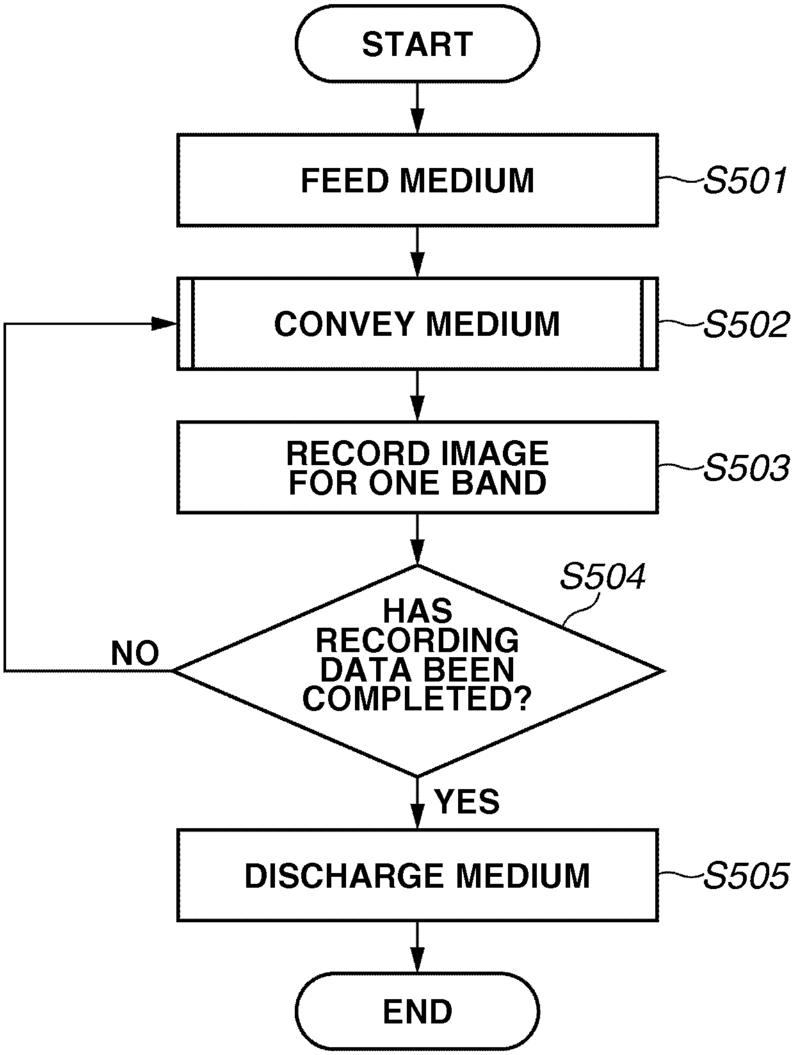
FIG. 5 is a flowchart illustrating an operation sequence of feeding, recording, and discharging a medium.

FIG. 5 is a flowchart illustrating a series of operation sequences for feeding, recording, and discharging. These operation sequences are performed based on the instructions given by the controller 100.

In step S501, the feeding motor 161 is driven to cause the feeding roller 209 to separate each one of the media 207 stored on the tray 208 and to feed the medium 207 along a conveyance path. When the paper end sensor 132 detects a leading end of the medium 206 that is being fed, based on the detection timing, a recording starting position setting operation is performed on a following medium, and then the following medium is conveyed to a predetermined recording starting position.

In step S502, the medium 206 is step-fed by predetermined amount using the conveyance belt 205. The predetermined amount refers to a length of one band recording (one main scanning performed by the printer head) in the sub scanning direction. For example, when a multi path recording is performed by feeding the medium 206 by a half of a width of a nozzle array in the sub scanning direction of the print head 213 and superposing the images recorded each two times, the predetermined amount is a length of a half width of the nozzle array.

In step S503, the image for one band is recorded while the carriage 212 is moving the print head 213 in the main scanning direction. In step S504, it is determined whether recording has been performed on all recording data. When there is the recording data that has not been recorded yet (NO in step S504), the processing returns to step S502 and performs the step-feeding in the sub scanning direction and the recording for one band in the main scanning direction again. When the recording has been completed (YES in step S504) of all recording data, the processing proceeds to step S505. In step S505, the medium 206 is discharged from the recording unit. As described above, a two-dimensional image is formed on the medium 206.

With reference to a flowchart illustrated in FIG. 6, an operation sequence of step-feeding performed in step S502 will be described in detail. In step S601, the image sensor of the direct sensor 134 captures an image of the region of the conveyance belt 205 including the marker. The acquired image data indicates a position of the conveyance belt before the movement has been started, and is stored in the RAM 103.

In step S602, while the rotation state of the first roller 202 is being monitored by the encoder 133, the conveyance motor 171 is driven to move the conveyance belt 205, in other words, conveyance control is started on the medium 206. The controller 100 performs servo-control to convey the medium 206 by a target amount of conveyance. Under the conveyance control using the encoder, the processing consequent to step S603 is executed.

In step S603, the direct sensor 134 captures the image of the belt. The image is captured when it is estimated that a predetermined amount of medium has been conveyed. The conveyance of the predetermined amount of medium is determined by the amount of the medium to be conveyed for one band (hereinafter, referred to as “target amount of conveyance”), a width of the image sensor in the first direction, and a conveyance speed.

According to the present exemplary embodiment, a specific slit on the code wheel 204 to be detected by the encoder 133 when the predetermined amount of conveyance has been conveyed is specified. When the encoder 133 detects the slit, capturing the imaging is started. Further detail performed in step S603 will be described below.

In step S604, what distance the conveyance belt 205 is moved between the second image data captured in step S603, which is immediately before step S604, and the first image data, which is captured one previous to the second image data, is detected using image processing. Details of processing for detecting the amount of movement will be described below. The images are captured at a predetermined interval the predetermined number of times according to the target amount of conveyance.

In step S605, it is determined whether capturing images the predetermined number of times has been completed. When capturing images the predetermined number of times is not completed (NO in step S605), the processing returns to step S603 and the operation is repeatedly performed until capturing images the predetermined number of times is completed. The amount of conveyance is accumulated every time the amount of conveyance is repeatedly detected the predetermined number of times. The amount of conveyance for one band from the timing when the image is first captured in step S601 is then acquired.

In step S606, an amount of difference for one band between the amount of conveyance acquired by the direct sensor 134 and that by the encoder 133 is calculated. The encoder 133 indirectly detects the amount of conveyance, and thus accuracy of indirect detection of the amount of conveyance performed by the encoder 133 is lower than that of direct detection thereof performed by the direct sensor 134. Therefore, the amount of difference described above can be regarded as a detection error of the encoder 133.

In step S607, correction is given to the conveyance control by the amount of the encoder error acquired in step S606. The correction includes a method for correcting information about a current position under the conveyance control by increasing/decreasing by the amount of error, and a method for correcting the target amount of conveyance by the error amount. Any one of the methods may be adopted. As described above, the medium 206 is correctly conveyed until the target amount of the medium 206 is conveyed by the feedback control, and then the conveyance of the amount for one band is completed.

Figure 7:
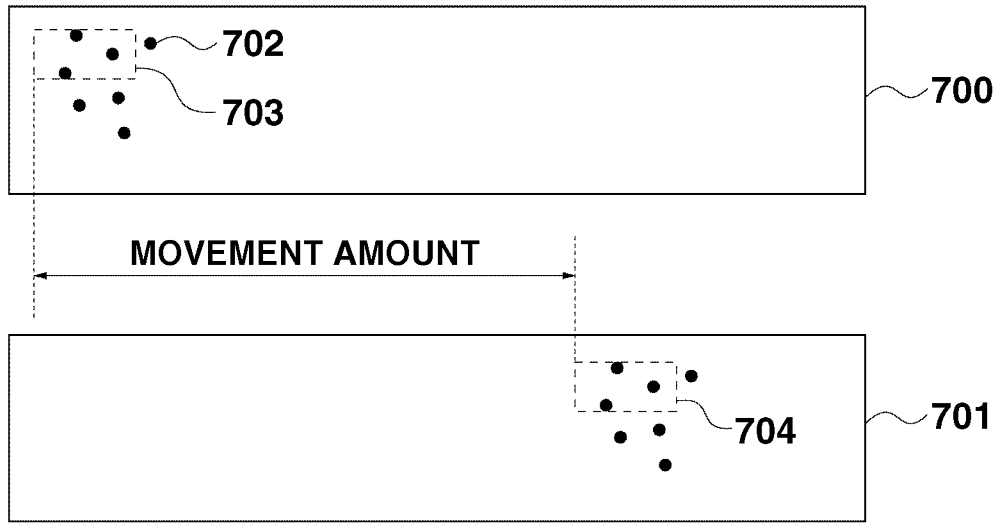
FIG. 7 illustrates processing for acquiring an amount of movement by pattern matching.

FIG. 7 illustrates details of processing performed in step S604 described above. FIG. 7 schematically illustrates first image data 700 of the conveyance belt 205 and second image data 701 thereof acquired by capturing the images by the direct sensor 134.

A number of patterns 702 (part having gradation difference between brightness and darkness) indicated with black points in the first image data 700 and the second image data 701 are formed of a number of images of markers provided on the conveyance belt 205 randomly or based on a predetermined rule. Similar to an apparatus illustrated in FIG. 2, when the object is the medium, microscopic patterns (e.g., pattern of paper fibers) on the surface of the medium are similarly used to the patterns that is given on the conveyance belt 205.

For the first image data 700, a template pattern 703 is set at an upstream side, and the image of this part is clipped. When the second image data 701 is acquired, where a pattern similar to the clipped template pattern 703 is located in the second image data 701, is searched.

The search is performed by the pattern matching method. As an algorithm for determining similarity, Sum of Squared Difference (SSD), Sum of Absolute Difference (SAD), Normalized Cross-Correlation (NCC) are known, and any of those may be adopted.

In this example, the most similar pattern is located in a region 704. An amount of difference between the number of pixels on the imaging device of the template pattern 703 in the first image data 700 and that of the region 704 in the second image data 701 in the sub scanning direction is acquired. By multiplying the amount of the difference between the numbers of pixels described above by a distance corresponding to one pixel, the amount of the movement (amount of conveyance) can be acquired.

<Method for Decreasing Object Blur Width>

Figure 6:
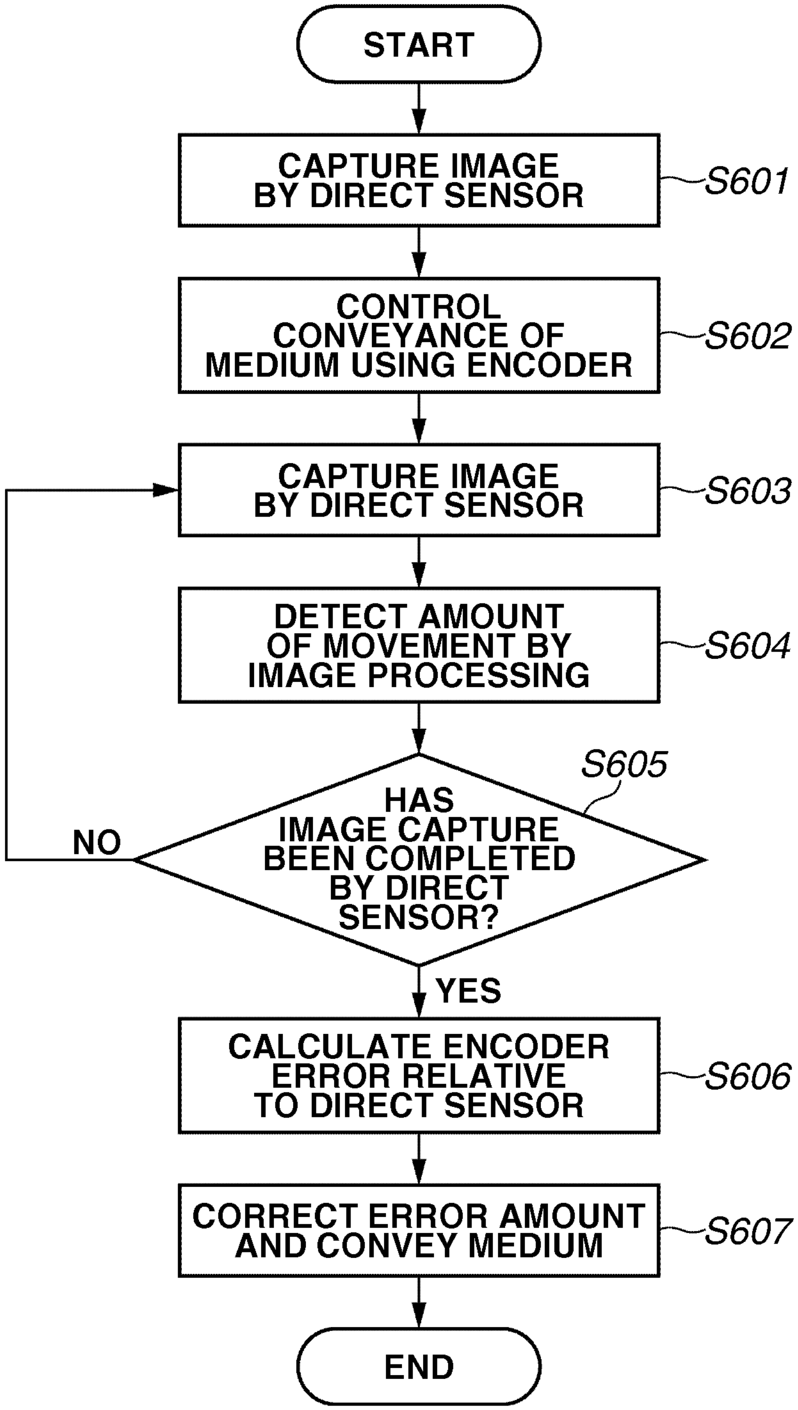
FIG. 6 is a flowchart illustrating an operation sequence for conveying the medium.

As described above with reference to FIG. 15, in step S603 illustrated in FIG. 6, when a plurality of images are acquired and, and if the object moves at different speeds, the image data having different object blur widths are acquired, thereby deteriorating accuracy of the pattern matching. A basic idea for solving this issue according to the present exemplary embodiment is, based on the detection by the encoder when images are captured, the image capture is controlled to decrease a difference between the object blur widths when the images are captured a plurality of number of times.

Figure 14:
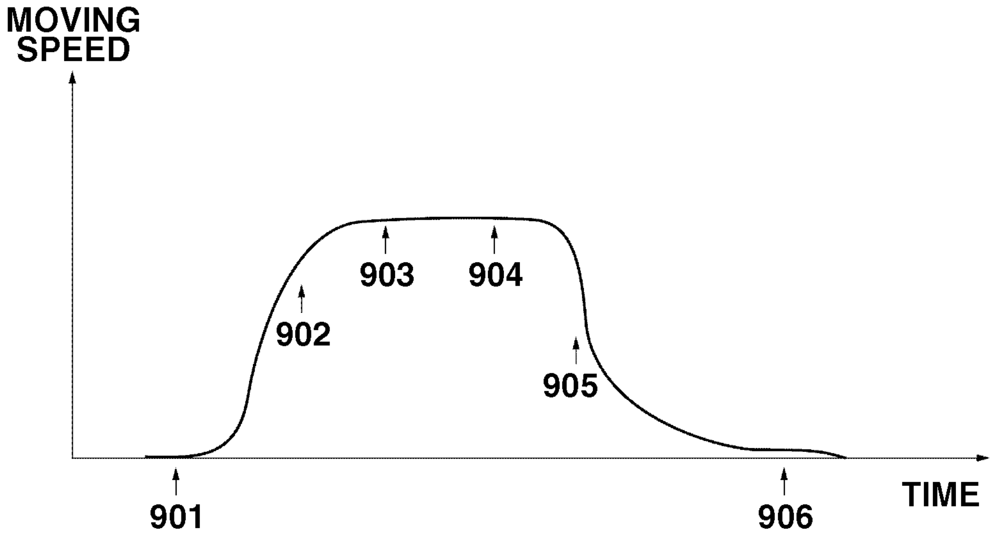
FIG. 14 is a graph illustrating an example of a speed profile.

FIG. 14 is a graph illustrating an example of a speed profile of a conveyance speed in a conveyance step (step S502 illustrated in FIG. 5) of the medium for one band. Each of times 901, 902, 903, 904, 905, and 906 indicates a timing for capturing the image. The time 901 indicates a still state before driving is started, and the time 906 indicates the image capture during low speed driving right before the driving is stopped. A case where the images are captured at two timings of the times 902 and 903 will be described as an example.

According to the present exemplary embodiment, the direct sensor 134 includes the image sensor whose one pixel is 10 μm in size, and the image of the object is formed on the image sensor in a same size as that of the object. Further, a minimum unit (one pulse) for measuring a position by the encoder is defined as one count, and a resolution of the medium converted from the count of the encoder 133 is defined as 9,600 counts per inch. In other words, the one-count driving moves the object about 2.6 μm.

The moving speed of the object at the time 902 is 500 μm/ms, and the moving speed of the object at the time 903 is 750 μm/ms. Further, a target object blur width is 70 μm. In other words, the value of the encoder 133 converted into the count value is 27 counts.

Two methods for decreasing the object blur width based on the detection by the encoder will be described.

A first method controls the exposure time for capturing the images by controlling the timings of starting and stopping the image capture (exposure) in synchronization with detection results by the encoder (pulse signals). The controller controls the timings for starting and stopping the image capture when the image sensor acquires the first image data and the second image data.

Figure 9:
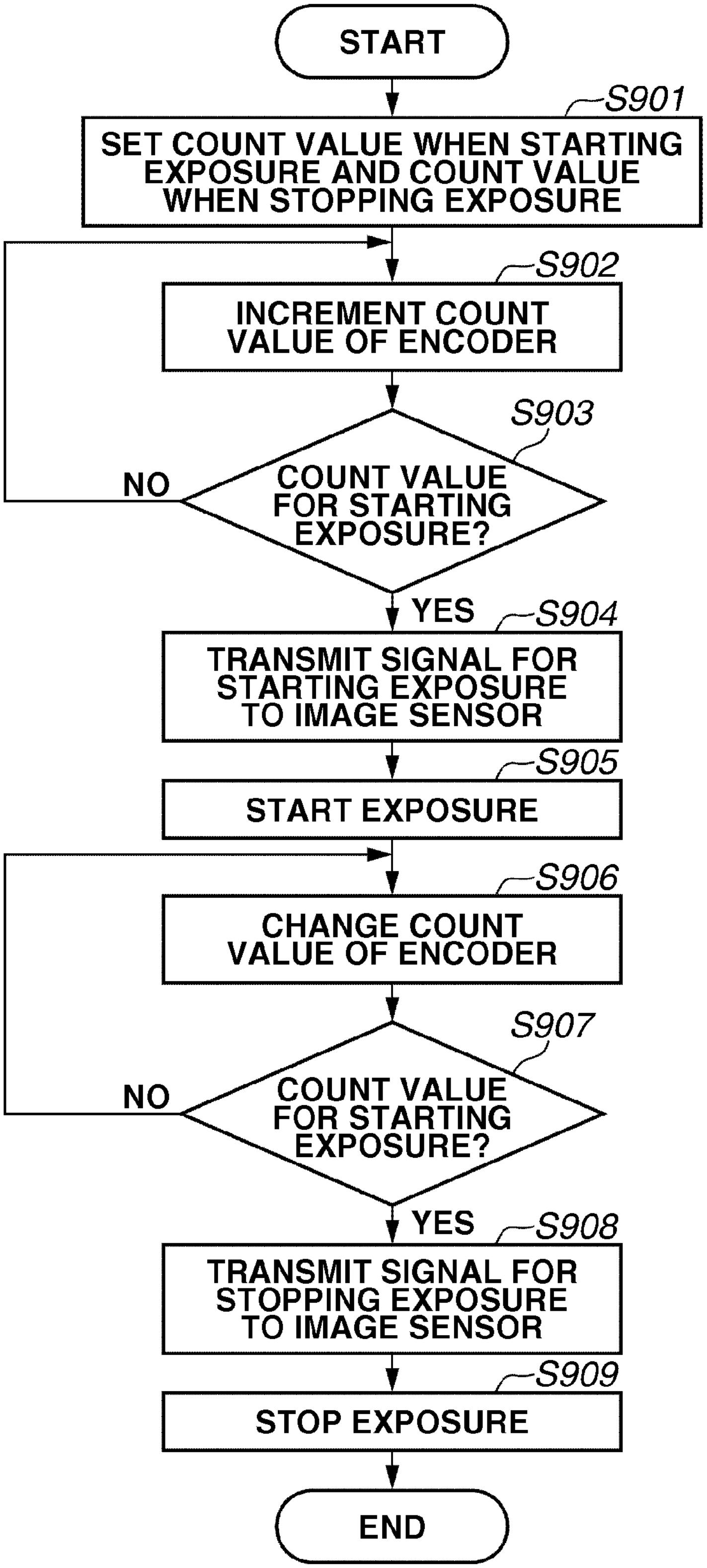
FIG. 9 is a flowchart illustrating an example of a processing procedure for decreasing a difference between object blur widths based on encoder detection.

A processing procedure of the first method will be described with reference to FIG. 9.

In step S901, a count value for starting the exposure, which is determined from the speed profile about the conveyance, and a count value for stopping the exposure, which is acquired by adding 27 counts to the count value for starting the exposure, are stored in the register of the controller 100. In step S902, the count value of the encoder 133 is incremented along with the movement of the object.

In step S903, the controller 100 waits until the count value reaches the count value for starting the exposure stored in the register. When the count value has reached the count value for starting the exposure (YES in step S903), the processing proceeds to step S904. In step S904, a signal for starting the exposure is transmitted to an image sensor 302.

The controller 100 transmits the signals for starting and stopping the exposure when the respective count values of the encoder 133 correspond to the respective values stored in the register. In step S905, the image sensor 302 starts the exposure to capture the images. In step S906, the count value of the encoder 133 is increased along with the movement of the object during the exposure.

In step S907, the controller 100 waits until the count value reaches the count value for stopping the exposure stored in the register. When the count value has advanced 27 from the start of the exposure (YES in step S907), the processing proceeds to step S908. In step S908, the signal for stopping the exposure is transmitted to the image sensor 302. In step S909, the image sensor 302 receives the signal for stopping the exposure and stops the exposure, and then one image capture is completed.

As described above, irrespective of the moving speed of the object, since the exposure is performed only during a period when the count value of the encoder 133 advances 27, the image having the object blur whose width is uniformly 70 μm (equivalent to seven pixels) is acquired. Compared to the exposure times to each other, the exposure time is about 0.14 ms at the time 902 (500 μm/ms) and about 0.10 ms at the time 903 (750 μm/ms).

The second method estimates the speed for capturing the images based on the detection by the encoder, and based on the estimated speed, the exposure time is determined to perform the exposure. The controller acquires the estimated value of the moving speed of the object when the images are captured and controls the time for exposing the image sensor from the estimated value and the target object blur width.

Figure 10:
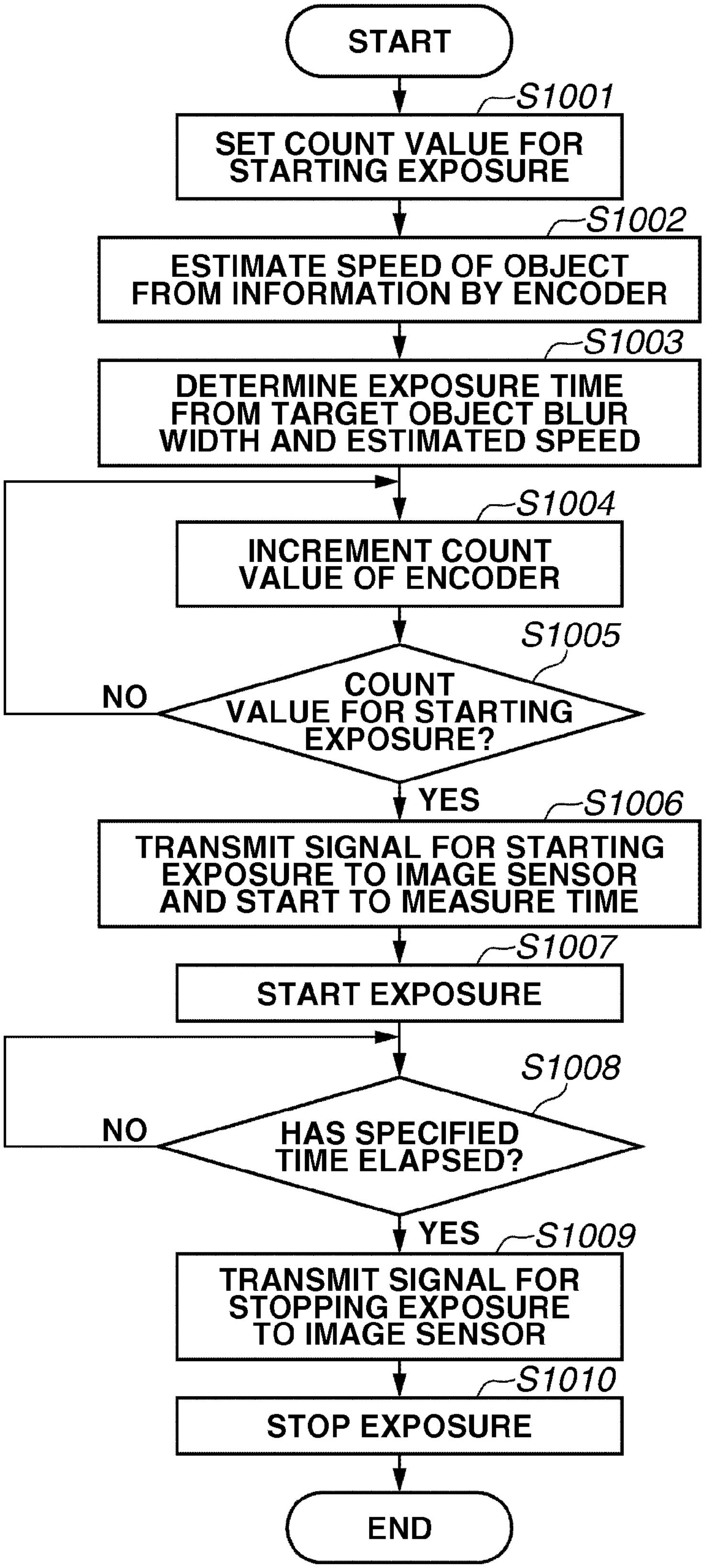
FIG. 10 is a flowchart illustrating another example of the processing procedure for decreasing the difference between the object blur widths based on the encoder detection.

The processing procedure of the second method will be described with reference to FIG. 10. In step S1001, the count value for starting the exposure determined from the speed profile about the conveyance is set and stored in the register. In step S1002, the average speed of the object during the exposure is estimated.

Speed information is acquired from the information from the encoder 133 right before the exposure (timings of a plurality of count values). Based on an assumption that the same speed continues during the exposure, the acquired speed is determined as the estimated speed value of the object during the exposure. Further, the speed right before the exposure may be corrected using speed history or the speed profile. Alternatively, instead of using the encoder 133, from the speed profile used by a control system of the driving mechanism, the estimated speed value during the exposure may be acquired.

In step S1003, a predetermined exposure time, by which the object blur width becomes a predetermined target value, is acquired by calculation from the above-described estimated speed value. Since the object blur width is the multiplication of the exposure time and the average speed of the object during the exposure, the object blur width can be acquired by calculating as follows.

Exposure time=Target object blur width/Estimated speed value

According to the example of the present exemplary embodiment, the exposure time is about 0.14 ms for capturing the image at the time 902, and about 0.10 ms at the time 903.

In step S1004, the count value of the encoder 133 is increased along with the movement of the object. In step S1005, the controller 100 waits until the count value reaches the count value for starting the exposure stored in the register. When the count value has reached the count value for starting the exposure (YES in step S1005), the processing proceeds to step S1006.

In step S1006, the signal for starting the exposure is transmitted to the image sensor 302, and at the same time, a timer included in the controller 100 starts to measure the exposure time. In step S1007, the image sensor 302 starts the exposure for capturing the images. In step S1008, the count value of the encoder 133 is increased along with the movement of the object during the exposure.

In step S1008, it is determined whether an exposure time predetermined in step S1003 has elapsed. When it is determined that the predetermined exposure time has elapsed (YES in step S1008), the processing proceeds to step S1009. In step S1009, the signal for stopping the exposure is transmitted to the image sensor 302.

In step S1010, the image sensor 302 receives the signal for stopping the exposure and stops the exposure, and then one image capture is completed. By the processing described above, even if the object moves at the different speeds when the first image data and the second image data are acquired, the images can be captured during the exposure time in which the object blur widths can be substantially equal. More specifically, a plurality of images having the object shake whose widths are uniquely 70 μm and, as converted into the number of the pixels, seven pixels can be acquired.

The second method may be adopted for the case where the image sensor cannot be instructed to stop the exposure but can only be set the exposure time and starting of the exposure. When such an image sensor is used, if the exposure time is set for the image sensor in step S1003, the image sensor stops the exposure by itself after the set time has elapsed since the exposure has been started. Accordingly, the determination in step S1008 is not necessary.

By adopting any one of the above-described two methods, although the object moves at the different speeds when a plurality of images are acquired, a difference in the object blur can be within a permissible range for the pattern matching processing.

<Correction Processing for Decreasing Influence of Difference Between Exposure Times>

As described above, when the exposure time is changed and other conditions are set the same, it is conceivable that the brightness of the captured images is changed to exert influence on the image processing by the pattern matching. To address this issue, correction processing for decreasing the influence of the difference between the exposure times is performed.

Figure 8:
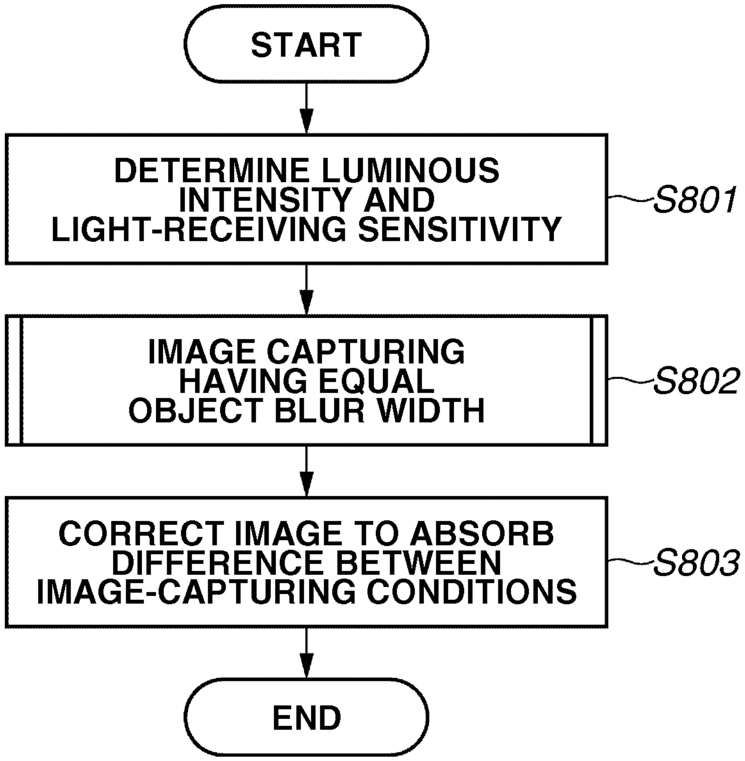
FIG. 8 is a flowchart illustrating a sequence of an image capture operation including correction processing for decreasing influence of a difference between exposure times.

As illustrated in FIG. 8, two types of correction processing including the processing for adjusting at least one of the luminance intensity and light-receiving sensitivity of the direct sensor and the image processing for absorbing the difference between the image capture conditions are performed in step S801 and step S803 respectively before and after the image capture operation performed in step S802. Either one of the above-described correction processing may be performed. If the image sensor of the direct sensor having a large dynamic range is used, the above-described correction processing may be omitted.

First, the processing performed in step S803 illustrated in FIG. 8 will be described. In a case where a plurality of images are captured at different exposure times, when a plurality of acquired images are compared to each other, levels of pixel values (brightness) are different as a whole. Because of shading correction and characteristics of the photoelectric conversion of the light-receiving element, relationship between the pixel value and the exposure time has a non-liner shape and monotonous increment. Therefore, if the pattern matching using a reference image (first image) and an image to be measured (second image) is performed, the accuracy may be deteriorated due to difference over entire brightness.

Therefore, in step S803, the brightness is corrected by the image processing. Two methods for correcting the image will be described.

A first method determines correction to be performed only from the reference image and the image data of the image to be measured. In other words, this method is not based on the characteristics of the image sensor or the image capture conditions. For example, a histogram of the acquired image is calculated, and the brightness and the contrast are corrected to be close to the reference histogram.

The second method is that pixel values, after the correction, are determined for all pixel values according to the characteristics of the image sensor and the image capture conditions, and conversion is performed on all pixels according to each corresponding their relationship. The image capture conditions refer to the exposure time, the luminance intensity of a light source, and the light-receiving sensitivity of the image sensor that are changed for each image capture.

The second method is more appropriate than the first method, however, the relationships between the image capture condition and the pixel value is to be known. More specifically, when a pixel value of a certain pixel under a certain image capture condition is known, a pixel value of the pixel under another image condition is to be known. In addition to the exposure time, when the image capture conditions such as the luminance intensity of the light source and the light-receiving sensitivity of the image sensor are changed, data corresponding to the changed image capture conditions may be necessary.

The second method is characterized in that, when the image capture conditions are determined even without the data of whole one image, the value after each pixel value is converted can be determined. Therefore, the second method is useful for a processing system that has less time for acquiring results of measuring positions after the image has been captured. Conversion processing is sequentially performed by the pixel or by the plurality of pixels while the image is being transmitted from the image sensor, thereby decreasing the delay generated by this processing.

Figure 11:
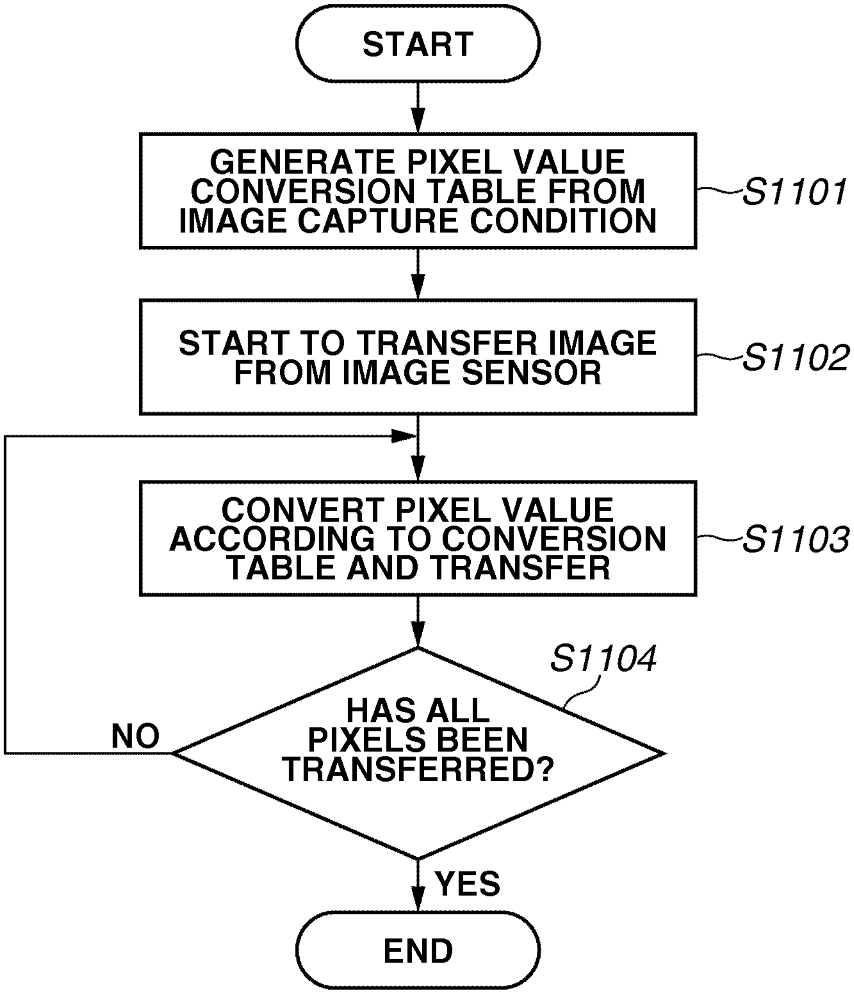
FIG. 11 is a flowchart illustrating an example of processing procedure of image correction for correcting brightness.

A processing procedure of the second method will be described with reference to FIG. 11. In step S1101, based on information determined from characteristics unique to the recording apparatuses including characteristics of the image sensor and that of shading correction, the image capture conditions used by the image capture performed in step S802 are input to generate a pixel value conversion table. In step S1102, transmitting the captured image data is started from the image sensor to the RAM 103.

In step S1103, in a path between the image sensor to the RAM 103, the pixel value is converted according to a conversion table by a CPU 101 or a circuit specified for conversion, and transmitted to the RAM 103 to be recorded.

In step S1104, it is determined whether all pixels in one image have been transmitted. When all the pixels have not been transmitted yet (NO in step S1104), the processing returns to step S1103. When all the pixels have been transmitted (YES in step S1104), the processing for correcting the image ends.

Next, the processing performed in step S801 illustrated in FIG. 8 will be described. The above-described step S803 is performed to fix the influence of a difference between the exposure times by the image correction. However, when the difference between the exposure times is extremely large, a normal image may not be able to be acquired.

For example, the speed for capturing the image at the time 904, when the object is driving at the maximum speed, is one hundred times higher than that at the time 906 right before the object is being stopped. Thus, the exposure time at the time 906 is one hundred times longer than the exposure time at the time 904. In this case, if the exposure time is too short, charge amount to be stored is too small to be reflected as the pixel values, or the S/N ratio becomes low to increase a noise of the image. On the other hand, when the exposure time is too long, the pixel values are saturated to make all pixel values equal, thereby making it difficult to identify the pixels.

In step S801, the correction processing for dealing with such a large change of the exposure time is performed. In step S801, to capture each image, the luminous intensity of the light source provided with the direct sensor 134, which is the illumination intensity in an image capture region, or the light-receiving sensitivity of the image sensor is changed.

The light-receiving sensitivity of the image sensor referred to herein is, for example, an amplification gain of the signal intensity to the stored charges, and it is performed only in the image sensor before the pixel value of the image data is determined, and cannot be substituted by the digital data processing performed afterward.

When the correction is performed, for an arbitrary exposure time within an available range, a range of a combination of the luminance intensity of the light source and the light-receiving sensitivity of the image sensor, in which a normal image can be acquired, are known.

When the images are captured with the luminance intensity and the light-receiving sensitivity selected in the range, the images having the brightness suitable for the pattern matching can be acquired by the image correction performed in step S803 described below. If the image having the appropriate brightness can be acquired by the correction performed in step S801, the image correction performed in step S803 may be omitted.

Figure 12:
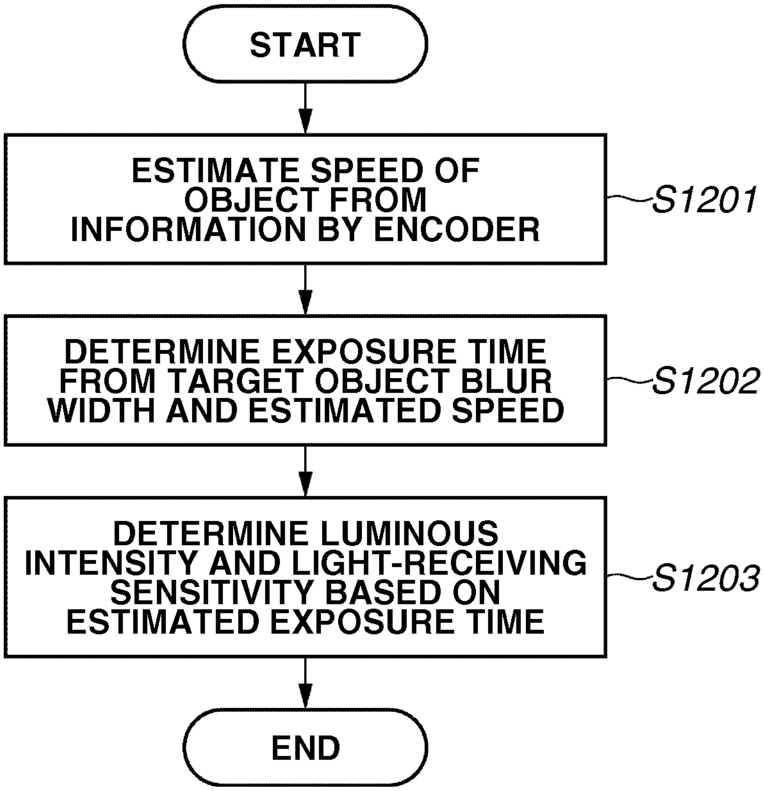
FIG. 12 is a flowchart illustrating another example of the processing procedure of the image correction for correcting the brightness.

A processing procedure performed in step S801 will be described with reference to FIG. 12. In step S1201, the speed information is acquired from the information (timings of a plurality of count values) from the encoder 133 right before starting the exposure. Based on an assumption that the same speed continues during the exposure, the acquired speed is defined as the estimated speed value of the object during the exposure.

In step S1202, the exposure time during which the object blur width becomes a predetermined target value is acquired by calculation from the above-described estimated speed value. As described above, since the object blur width is the multiplication of the exposure time and the average speed of the object during the exposure, the object blur width can be readily acquired. In step S1203, based on the estimated exposure time, the luminance intensity of a light source 301 and the light-receiving sensitivity of the light-receiving unit including the image sensor 302 and an analog front end are appropriately determined.

An appropriate set-up means the set-up made within a range where a normal image is captured without incidents such as saturation of the pixel values and the generation of the noise, when being captured within the exposure time. For example, at the time 904 illustrated in FIG. 14, since the object moves at the maximum speed, both of the luminance intensity and the light-receiving sensitivity are set to large values.

On the other hand, since the object moves at the speed of nearly zero at the time 906, both of the luminance intensity and the light-receiving sensitivity are set to small values. As described above, under the conditions set in step S801, the images are captured in step S802.

Even not using the encoder, from the speed profile used by a control system of the driving mechanism, the estimated speed value during the exposure can be acquired. Thus, based on the speed profile, the luminance intensity and the light-receiving sensitivity may be set. Further, it is not limited to changing both of the luminance intensity of the light source and the light-receiving sensitivity of the image sensor, but at least one of the two may be changed.

<Determination of Target Object Blur Width>

Figure 13:
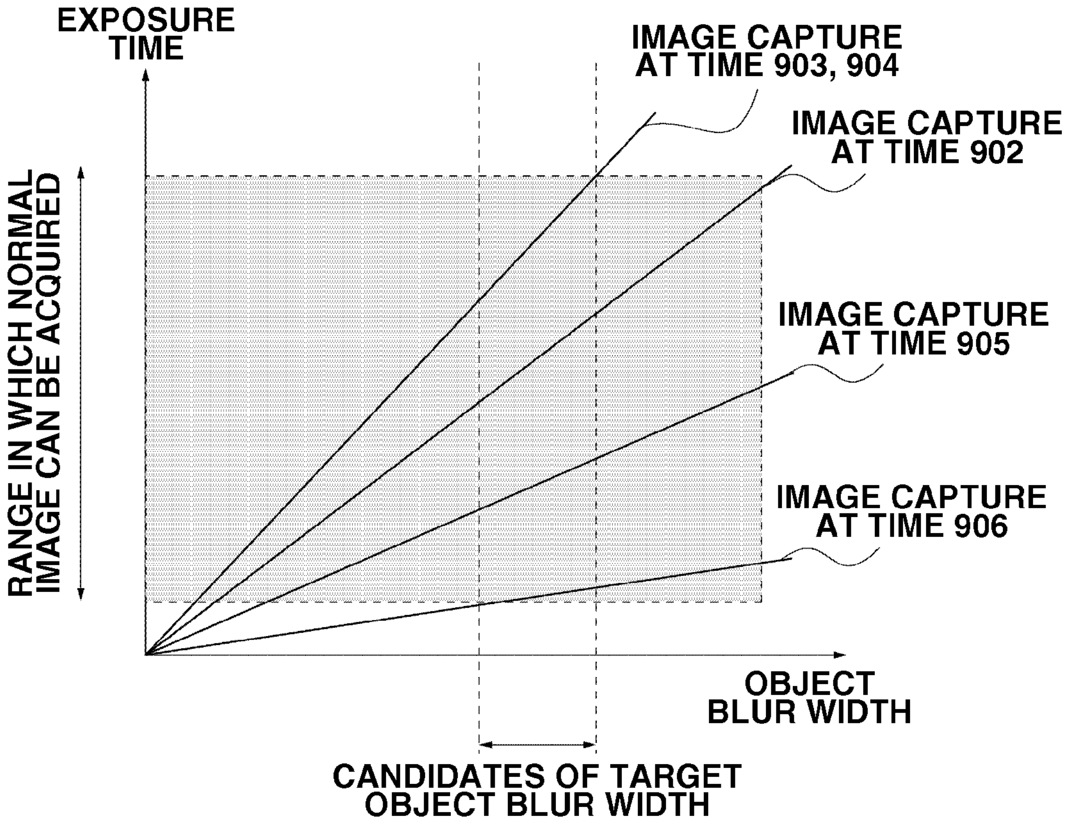
FIG. 13 schematically illustrates a method for determining a target object blur width.

How to determine the target object blur width in the above description will be described. FIG. 13 schematically illustrates a method for determining the target object blur width. One operation for transmitting the object is performed based on the speed profile as illustrated in FIG. 14, and the timing for capturing the image is six points from the time 906 to the time 901.

The graph illustrated in FIG. 13 illustrates a relationship between the exposure time and the object blur width when the image is captured at each time (time 902, 903, 904, 905, and 906). It can be known that each graph is liner and the graphs have different slopes according to the speeds. The region of the exposure times where the normal images can be acquired is indicated in gray.

Within the area where all the times 902, 903, 904, 905, and 906 are included in the gray area, candidates of the target object blur width are set. The area including the candidates of the target object blur width in this example is indicated with two dot lines.

When the target object blur width is too small, even if the maximum luminance intensity and the maximum light-receiving sensitivity are set for the direct sensor at the times 903 and 904 when the object moves at high speed, the exposure times are too short. Thus, the pixel values become submerged by the noise.

On the other hand, when the target object blur width is too large, even if the minimum luminance intensity and the minimum light-receiving sensitivity are set for the direct sensor at the time 906 when the object moves at a slow speed, the exposure time is too long. Thus, the pixel values become saturated. To address this issue, according to the present exemplary embodiment, the object blur widths are set as the target value within the appropriate area indicated with the two dot lines, thereby enabling the normal images suitable for the pattern matching processing to be acquired.

At the time 901, since the image is captured when the object is in a still state, the object blur does not occur. Accordingly, a difference between the object blur widths generated at the times 901 and 902 cannot be avoided from being generated. In the present exemplary embodiment, only the time 901 is counted out from consideration, and the difference between the object blur widths generated at the times 901 and 902 is considered permissible. Alternatively, the difference does not to be considered permissible, and the image has not to be captured at the time 901 when the object is in a still state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-250826 filed Oct. 30, 2009, which is hereby incorporated by reference herein in its entirety.

What is claimed is:

1. An apparatus comprising:

a conveyance mechanism having a rotating member configured to move an object;

an encoder configure to detect a rotation state of the rotating member;

a sensor configured to capture an image of a surface of the object to acquire first data and second data;

a processing unit configured to acquire a movement state of the object by clipping a template pattern from the first data and seeking a region having a high correlation with the template pattern in the second data; and a control unit configured to control the sensor to decrease a difference between an object blur width in a direction in which the object moves in the first data and the object blur width in the second data, wherein the control unit controls timings for starting and stopping capturing images when the sensor captures the first data and the second data, based on detection by the encoder.

2. The apparatus according to claim 1, wherein, when at least one of the first data and the second data is captured, the control unit controls an exposure time for capturing the image according to a moving speed of the object while the sensor is capturing the image.

3. The apparatus according to claim 1, wherein the control unit acquires estimated value of a moving speed of the object when the image is captured, and perform control for determining an exposure time of the sensor from the estimated value and target object blur width.

4. The apparatus according to claim 3, further comprising:

a conveyance mechanism configured to move the object; and an encoder configured to detect a rotation state of a rotating member of the conveyance mechanism, wherein the control unit acquires the estimated value based on detection by the encoder.

5. The apparatus according to claim 1, wherein the control unit determines a target value of the object blur width based on a speed profile for controlling the object to move, and, based on the determined target value, sets exposure time for capturing images.

6. The apparatus according to claim 1, wherein the control unit controls at least one of light-receiving sensitivity of the sensor and luminous intensity in an image capture region to change according to an exposure time for capturing images.

7. The apparatus according to claim 1, wherein the control unit, after at least one of the first and the second data is corrected according to an exposure time for capturing the image, seeks the region using the corrected data.

8. The apparatus according to claim 1, wherein the object is a medium or a conveyance belt that mounts and conveys the medium.

9. An apparatus comprising:

a conveyance mechanism including a driving roller configured to move an object;

an encoder configured to detect a rotation state of the driving roller;

a sensor configured to capture an image of a surface of the object to acquire first data and second data;

a processing unit configured to acquire a movement state of the object by clipping a template pattern from the first data and seeking a region having a high correlation with the template pattern in the second data; and a control unit configured to control an exposure time for capturing the image of the sensor to decrease a difference between an object blur width in a direction in which the object moves in the first data and the object blur width in the second data, wherein, based on the rotation state and the moving state, the control unit controls driving of the driving roller.

10. The apparatus according to claim 9, wherein the control unit sets an exposure time for capturing the image of the sensor based on detection by the encoder.

11. A control method comprising:

causing a conveyance mechanism to move an object;

causing an encoder to detect a moving state of the conveyance mechanism;

causing a sensor to capture an image of a surface of a moving object to acquire first data and second data;

acquiring a movement state of the object by clipping a template pattern from the first data and seeking a region having a high correlation with the template pattern in the second data; and controlling the sensor to decrease a difference between an object blur width in a direction in which the object moves in the first data and the object blur width in the second data, controlling timings for starting and stopping capturing images when the sensor captures the first data and the second data based on detection by the encoder.

12. The method according to claim 11, further comprising, when at least one of the first data and the second data is captured, controlling an exposure time for capturing the image according to a moving speed of the object while the sensor is capturing the image.

13. The method according to claim 11, further comprising:

acquiring estimated value of a moving speed of the object when the image is captured, and performing control for determining an exposure time of the sensor from the estimated value and target object blur width.

14. The method according to claim 11, further comprising:

moving the object by a driving roller of a conveyance mechanism;

detecting a rotation state of driving roller; and controlling driving of the driving roller based on the rotation state and the moving state.

15. The method according to claim 11, further comprising:

determining a target value of the object blur width based on a speed profile for controlling the object to move; and setting exposure time for capturing images based on the determined target value.

16. The method according to claim 11, further comprising controlling at least one of light-receiving sensitivity of the sensor and luminous intensity in an image capture region to change according to an exposure time for capturing images.

* * * * *